(12) United States Patent
Rhoads

(10) Patent No.: US 6,920,232 B2
(45) Date of Patent: *Jul. 19, 2005

(54) WATERMARK ENCODING USING ARBITRARY FEATURES

(75) Inventor: Geoffrey B. Rhoads, West Linn, OR (US)

(73) Assignee: Digimarc Corporation, Beaverton, OR (US)

(*) Notice: Subject to any disclaimer, the term of this patent is extended or adjusted under 35 U.S.C. 154(b) by 630 days.

This patent is subject to a terminal disclaimer.

(21) Appl. No.: 10/003,717

(22) Filed: Oct. 22, 2001

(65) Prior Publication Data

US 2002/0090113 A1 Jul. 11, 2002

Related U.S. Application Data

(63) Continuation of application No. 09/434,757, filed on Nov. 4, 1999, now Pat. No. 6,307,949, which is a continuation-in-part of application No. 09/186,962, filed on Nov. 5, 1998, which is a continuation of application No. 08/649,419, filed on May 16, 1996, now Pat. No. 5,862,260, which is a continuation of application No. PCT/US96/06618, filed on May 7, 1996.

(51) Int. Cl.⁷ .............................................. H04K 1/00
(52) U.S. Cl. ..................................................... 382/100
(58) Field of Search ................................ 382/100, 232; 380/210, 252, 287, 54; 713/176; 370/527, 529; 381/73.1; 704/200.1, 270, 273

(56) References Cited

U.S. PATENT DOCUMENTS

| | | | |
|---|---|---|---|
| 4,389,671 A | 6/1983 | Posner et al. ................ | 358/124 |
| 5,134,496 A | 7/1992 | Schwab et al. .............. | 358/335 |
| 5,652,626 A | 7/1997 | Kawakami et al. ......... | 348/463 |
| 5,721,788 A | 2/1998 | Powell et al. ................ | 382/100 |
| 5,862,260 A | 1/1999 | Rhoads ........................ | 382/232 |
| 5,930,369 A | 7/1999 | Cox et al. ..................... | 380/54 |
| 5,933,798 A | 8/1999 | Linnartz ...................... | 702/191 |
| 5,960,398 A | 9/1999 | Fuchigami et al. ......... | 704/270 |
| 6,078,664 A | 6/2000 | Moskowitz et al. .......... | 380/28 |
| 6,128,736 A | 10/2000 | Miller ......................... | 713/176 |
| 6,272,634 B1 | 8/2001 | Tewfik et al. ............... | 713/176 |
| 6,381,341 B1 | 4/2002 | Rhoads ........................ | 382/100 |

FOREIGN PATENT DOCUMENTS

| | | | | |
|---|---|---|---|---|
| EP | 0581317 A2 | 2/1994 | ............ | G07D/7/00 |
| WO | WO98/02864 A1 | 1/1998 | ............ | G09C/5/00 |

OTHER PUBLICATIONS

Anderson, "Stretching the Limits of Steganography," Proc. First Int. Workshop on Information Hiding, LNCS vol. 1174, May/Jun. 1996, pp. 39–48.*

Aura, "Practical Invisibility in Digital Communication," Proc. First Int. Workshop on Information Hiding, LNCS vol. 1174, May/Jun. 1996, pp. 265–278.*

Langelaar et al., "Robust Labeling Methods for copy Protection of Images," Proc. SPIE Electronic Imaging, Feb. 1997, pp. 298–309.

(Continued)

Primary Examiner—Andrew W. Johns
(74) Attorney, Agent, or Firm—Digimarc Corporation

(57) ABSTRACT

Watermark detection in an image or the like is optimized by exploiting the innate biases in the image to emphasize the watermark signal. The watermark signal can be trial-located with different origins in the image to find one that yields improved results. Similarly, the image can be processed (e.g., by changing resolution, rotation, or compression) so as to change the innate biases to better reinforce the watermark signal. Compression of an image can be done in accordance with a desired watermark signal, with the compressor deciding which image components to retain and which to discard based, in part, on a watermark signal that is to be encoded (or maintained) in the image.

14 Claims, 2 Drawing Sheets

OTHER PUBLICATIONS

Kawaguchi et al., "Principle and Applications of BPCS—Steganography," Proc. SPIE vol. 3528, Nov. 1998, pp. 464–473.

Wang et al., "Image Protection via Watermarking on Perceptually Significant Wavelet Coefficients," Proc. IEEE, Dec. 1998, pp. 279–284.

Langelaar et al., "Watermarking by DCT Coefficient Removal: A Statistical Approach to Optimal Parameter Setting," Proc. SPIE vol. 3657, Jan. 1999, pp. 2–13.

Cox et al., "Watermarking as communications with Side Information," Proc. Of the IEEE, 87,7,1127–1141, 1999.

* cited by examiner

WATERMARK ENCODING USING ARBITRARY FEATURES

RELATED APPLICATION DATA

This application is a continuation of application Ser. No. 09/434,757, filed Nov. 4, 1999 (now U.S. Pat. No. 6,307,949), which is a continuation-in-part of copending application Ser. No. 09/186,962, filed Nov. 5, 1998, which is a continuation of application Ser. No. 08/649,419, filed May 16, 1996 (now U.S. Pat. No. 5,862,260), which claims priority to PCT application PCT/US96/06618, filed May 7, 1996.

The present subject matter is related to that disclosed in the assignee's other patents and applications, including U.S. Pat. No. 5,862,260, and copending applications Ser. Nos. 09/074,034, 09/127,502, 09/164,859, 09/292,569, 09/292,569, 09/314,648, 09/342,675, and 09/343,104.

BACKGROUND OF THE INVENTION

Watermarking is a well-developed art, with a great variety of techniques. Generally, all vary an original signal (corresponding, e.g., to audio or image data—video being considered a form of image data) so as to encode auxiliary data without apparent alteration of the original signal. Upon computer analysis, however, the auxiliary data can be discerned and read. (For expository convenience, the following discussion focuses on image data, although the same techniques are generally applicable across all watermarking applications.)

A problem inherent in all watermarking techniques is the effect of the underlying image signal. In this context the underlying image signal—although the intended signal for human perception—acts as noise for purposes of decoding of the watermark signal. In most cases, the energy of the image signal far exceeds that of the watermark signal, making watermark detection an exercise in digging out a weak signal amidst a much stronger signal. If the encoded image has been degraded, e.g., by scanning/printing, or lossy compression/decompression, the process becomes still more difficult. As watermarks become increasingly prevalent (e.g., for device control, such as anti-duplication features in reproduction systems), the importance of this problem escalates.

The present invention seeks to redress this problem.

DETAILED DESCRIPTION

Figure 1:
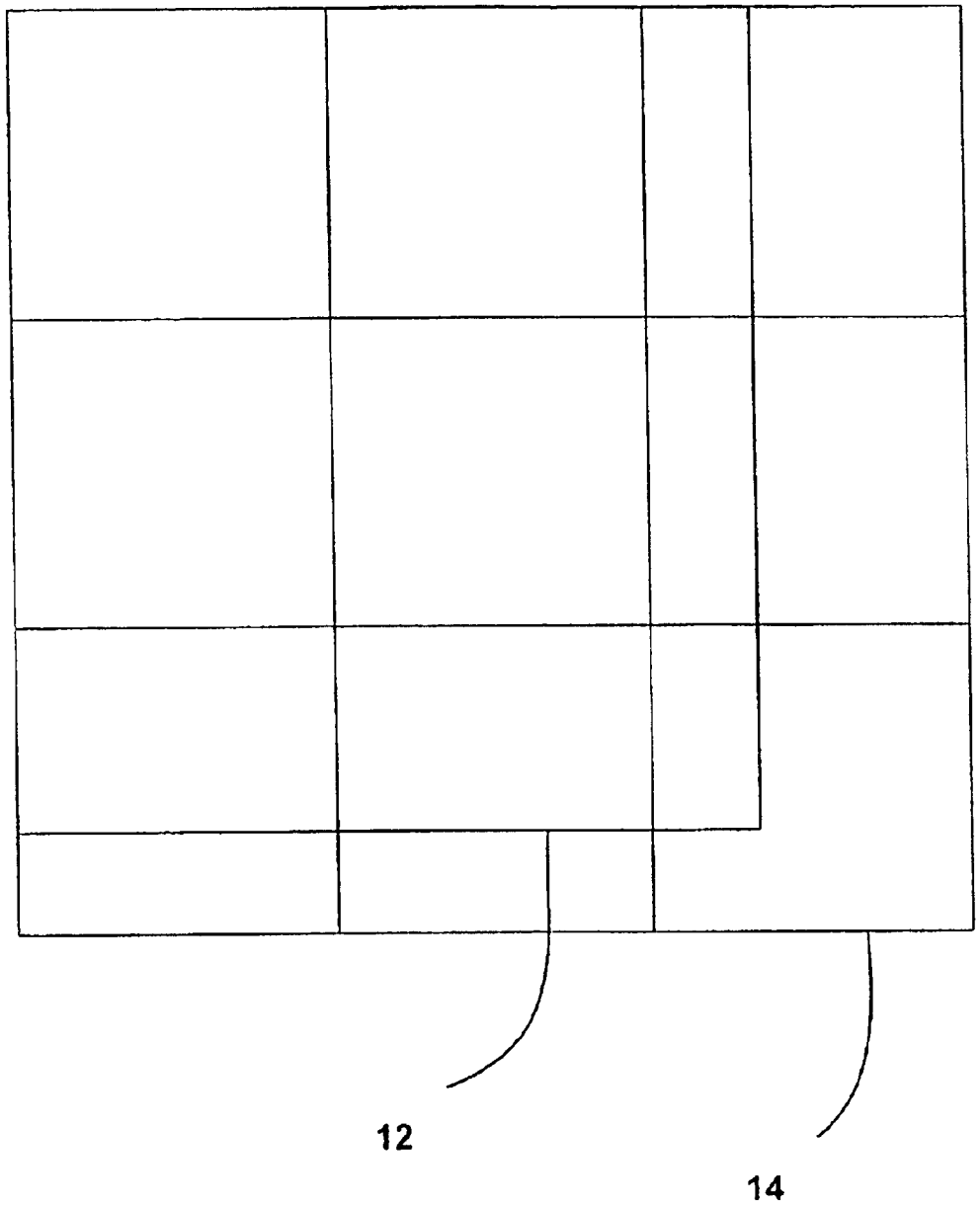
FIG. 1 shows how an image may be tiled with a watermark.
Figure 2:
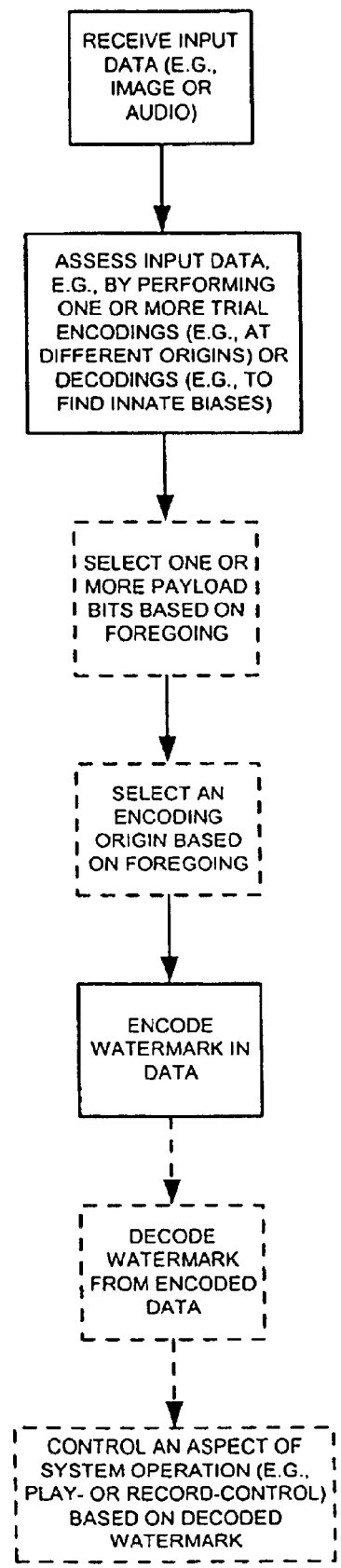
FIGS. 2 and 3 are flow charts illustrating methods according to different embodiments of the invention.
Figure 3:
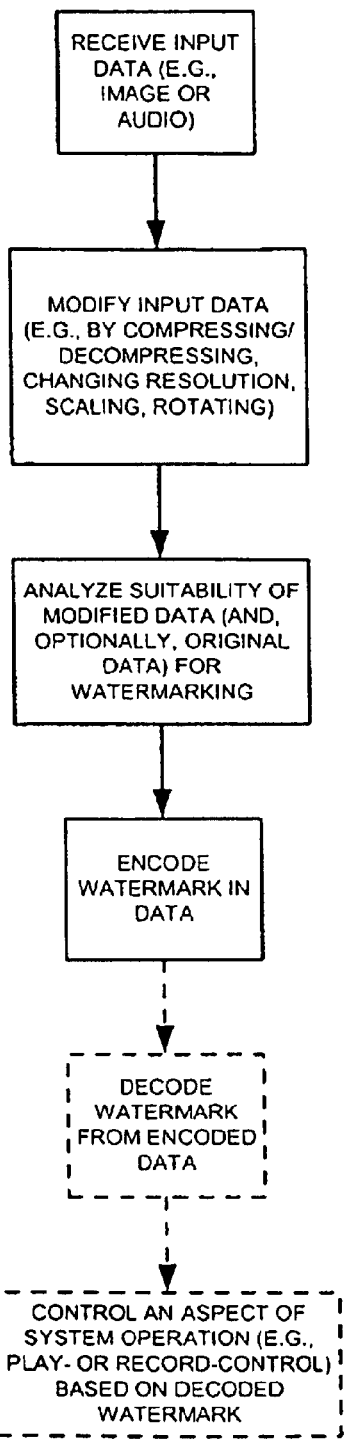

To mitigate the problem of detecting a watermark signal in the presence of a much-stronger image signal, certain choices are made early in the process—at the embedding operation.

The "noise" introduced by the image signal doesn't always hurt the detection process. Sometimes innate biases in pixel values, or other image characteristics (e.g., DCT, wavelet, or other transform coefficients), can actually serve to accentuate the watermark signal and thereby simplify detection.

Starting with a perhaps overly simple case, consider an image prior to watermark encoding. If the un-encoded image is analyzed for the presence of a watermark, none should be found. However, there are cases in which the innate image characteristics sufficiently mimic a watermark signal that a phantom watermark payload may nonetheless be decoded. If the application permits, the user may then encode the image with this watermark payload. This encoding just accentuates the phantom data signal coincidentally present in the image. Even if all of the added watermark energy is somehow thereafter lost, the watermark may still be detectable.

Most watermark decoding algorithms are designed to guard against detection of phantom watermarks in un-encoded images. For example, the algorithms may look for checksum bits in the watermark payload; if the payload bits don't correspond as expected to the checksum, the decoder may simply report that no watermark is detected. Other algorithms may employ some confidence metric for each of the decoded bits (e.g., signal-to-noise ratio). Unless the confidence metric for all the decoded bits exceeds a threshold value, the decoder may again report that no watermark is detected.

In applying the principles detailed in this specification, it is generally desirable to disable or circumvent mechanisms that guard against detection of phantom data so as to essentially force the decoder to make its best guess of what the watermark payload is—assuming there is a watermark present. In the case just discussed, this would involve circumventing checksum checks, and lowering the detection confidence thresholds until watermark data is discerned from the un-encoded image.

The approach just-discussed assumes that the image proprietor has total freedom in selection of the watermark payload. This may be the case when the image is being secretly marked with an identifier whose purpose is to identify unauthorized dissemination of the image—in such case, the identifier can be arbitrary. More commonly, however, the watermark payload data cannot be so arbitrarily selected.

A variant of the foregoing considers the phantom presence of specific watermark payload bits in the un-encoded image. Many watermark encoding techniques essentially encode each payload bit position separately (e.g., each bit corresponds to specific image pixels or regions, or to specific transform coefficients). In such arrangements, the unencoded image may mimic encoding of certain payload bits, and be indeterminate (or counter) as to others. Those bits for which the image has an innate bias may be incorporated into the watermark payload; the other bits can be set as may befit the application. Again, the image is then watermarked in accordance with the thus-determined payload.

(The notion that an image may have a preference for certain watermark payload data is expressed in various of my earlier patents, e.g., in U.S. Pat. No. 5,862,260, as follows:

The basic idea is that a given input bump has a preexisting bias relative to whether one wishes to encode a '1' or a '0' at its location, which to some non-trivial extent is a function of the reading algorithms which will be employed, whose (bias) magnitude is semi-correlated to the "hiding potential" of the y-axis, and, fortunately, can be used advantageously as a variable in determining what magnitude of a tweak value is assigned to the bump in question. The concomitant basic idea is that when a bump is already your friend (i.e. its bias relative to its neighbors already tends towards the desired delta value), then don't change it much. Its natural state already provides the delta energy needed for decoding, without altering the localized image value much, if at all. Conversely, if a bump is initially your enemy (i.e. its bias relative to its neighbors tends away from the delta sought to be imposed by the encoding), then change it an exaggerated amount. This later operation tends to reduce the excursion of this point relative to its neighbors, making the point less visibly conspicuous (a highly localized blurring operation), while providing additional energy detectable when decoding. These two cases are termed "with the grain" and "against the grain" herein.)

Again, the foregoing example assumes that the user has flexibility in selecting at least certain of the payload bits so as to exploit watermark biases in the image itself. Commonly, however, this will not be the case. In such cases, other approaches can be used.

One approach is to vary the origin of the encoded watermark data within the image. "Origin" is a concept whose precise definition depends on the particular encoding technique used. In the watermarking techniques disclosed in the commonly-owned patents and applications, the watermarking is performed on a tiled basis (FIG. 1), with a square watermark data block 14 (e.g., 128×128 pixels) being repetitively applied across the image 12. Heretofore, the upper left hand pixel of the first data block is made coincident with the upper left hand pixel in the image (the latter is the origin). Thereafter, the watermark block is tiled horizontally and vertically across the image, repeating every 128 pixels. At the right and bottom edges, the tiled data block may overlie the edge of the image, with some of the block lost off the edges. This arrangement is shown in FIG. 1.

The assignment of the origin to the upper left hand corner of the image is a matter of convention and simplicity more than design. The origin can be moved to the next pixel to the right, or the next pixel down, without impairing the watermark's operation. (The decoding technique detailed in the commonly-owned patents and applications determines the location of the origin by reference to a subliminal graticule signal embedded as part of the watermark. A related system is shown in U.S. Pat. No. 5,949,055. By such arrangements, the encoding origin can generally be placed arbitrarily.) Indeed, in the case just cited, there are 16,384 possible origins (128*128) in the image that can be used. (Beyond the first 128×128 pixels, the tiling starts duplicating one of the 16,384 states.)

When an un-encoded image is decoded using the upper left hand pixel as the origin, a first set of watermark payload biases, as described above, may be revealed. If the origin is moved a single pixel to the right, a second set of watermark payload biases becomes evident. Likewise for each of the 16,384 possible origins.

For short payloads (e.g., up to 12 bits), it is probable that one or more of the phantom watermarks that may be discerned from the un-encoded image—starting with different origin points—will exactly yield the desired payload. For longer payloads, an origin can likely be selected that will exhibit a phantom bias for many of the payload bits. The task then becomes one of searching for the origin that yields suitable results. ("Suitable" here depends on the application or the preferences of the user. At one extreme it can mean finding the single origin within the 16,384 possible that yields the best possible phantom watermark results. If several origins yield the same, desired, phantom watermark biases, then each can be analyzed to discern the one yielding the best signal-to-noise ratio. In other applications, searching for a suitable origin can mean finding the first of perhaps several origins that yield the desired innate payload bit biases-regardless of whether there may be others that yield the same payload bit biases at better signal-to-noise ratios. In still other applications, a suitable origin can be any point that yields innate payload bit biases better than the normal upper-left-corner-pixel case. Etc.)

Except in limited circumstances (e.g., encoding a watermark in a single image that may be replicated billions of times, such as a banknote), an exhaustive search to find the single best origin may be so computationally burdensome as to be impractical. There may commonly be shortcuts and clues based on particular image characteristics and the encoding/decoding algorithms that can be employed to speed the search process.

The "origin" need not be a spatial location. It can be any other reference used in the encoding process. Quantization-based watermark encoding schemes, for example, may tailor the quantization levels in accordance with the particular innate biases of the image to encode desired watermark data.

In other embodiments, the suitability of an image to accept a particular watermark having a particular origin may best be ascertained by modifying the image slightly, and analyzing the modified image to determine watermark suitability. For example, a trial watermark (complete or incomplete, reduced amplitude or full amplitude) might be inserted into part or all of the image with a trial origin. The analyzing could then include an attempted reading of the watermark to yield a performance metric (e.g., signal-to-noise ratio). Based on the results thus achieved, the suitability of the image to host such watermark data with that particular origin can be assessed, and the process repeated, if desired, with a different origin. After thus characterizing the suitability of the image to accept watermarks with different origins, the image may be watermarked using the origin found to yield the best performance.

Although the foregoing discussion focused on changing the origin of the watermarking, other parameters can also be varied to effect the "match" between the innate image characteristics and the watermark data. One such parameter is image resolution. Another is image rotation. Yet another is compression.

Consider a vector graphic image that is "ripped" to yield a set of pixel data. The conversion can yield any desired pixel spacing (resolution), e.g., 600 dpi, 720 dpi, etc. The different resolutions will yield images that may be differently suited to host a particular set of watermark data. By analyzing the image at different resolutions, one may be found that provides innate image attributes that best tend to reinforce the desired watermark signal.

Similarly, with rotation. It is not essential that the image be encoded with the "top" oriented vertically. By rotating the image 90, 180, 270 degrees (or even to intermediate rotation states) prior to watermark encoding, a state may be found that provides image attributes tending to assist with the watermark encoding.

In still other applications, image attributes may be changed by corrupting the image through differing degrees of lossy compression/compression. To human observers, the results of different compression processes may be imperceptible, yet in the encoding domains, the resulting changes may make a particular image better- or worse-suited to encoding with a particular watermark. Again, various such modifications can be made to the original image to try and find a counterpart image that coincidentally has attributes that tend to reinforce the desired watermark signal.

Image modifications other than changing resolution, rotation, and compression can similarly be pursued; these three are exemplary only.

Reference was sometimes made above to image attributes that "coincidentially" tended to reinforce the desired watermarking signal. In particular cases, such attributes needn't always be left to chance. For example, in the compression-based approach just-discussed, compression algorithms have a great deal of flexibility in determining what image components to maintain, and which to omit as visually superfluous. The decision whether or not to omit certain image components can be made dependent, in part, on a priori knowledge of a watermark payload that is to be encoded (or retained) in the image, so as to optimize the innate biases in the decompressed image accordingly. Indeed, the entire watermark encoding process may be realized through a suitable compression algorithm that operates to retain or discard image information based at least in part on the watermark-related attributes of the resulting image after processing.

In still other embodiments, a multi-way optimization process may be performed. The original image can be analyzed to find which of several different origins yields the best results. The original image can then be modified (e.g., resolution, rotation, compression), and a variety of different origins again tried. Still further modifications can then be made, and the process repeated—all with a view to optimizing the image's innate suitability to convey a particular watermark.

As is familiar to those skilled in the arts, the foregoing methods may be performed using dedicated hardware, through use of a processor programmed in accordance with firmware or software, etc. In the latter case the processor may include a CPU and associated memory, together with appropriate input and output devices/facilities. The software can be resident on a physical storage medium such as a disk, and can be loaded into the processor's memory for execution. The software includes instructions causing the CPU to perform the analysis, search, evaluation, modification, and other processes detailed above.

The variety of watermarking techniques is vast; the technology detailed above is believed applicable to all. The variety of watermarking techniques is illustrated, e.g., by earlier cited patents/applications, and U.S. Pat. Nos. 5,930,469, 5,825,892, 5,875,249, 5,933,798, 5,916,414, 5,905,800, 5,905,819, and 5,915,027.

Having described and illustrated the principles of my invention with reference to various embodiments thereof, it will be recognized that the invention can be modified in arrangement and detail without departing from such principles. For example, while the detailed embodiment particularly considered image data, the same principles are applicable to audio data. (The "origin"-based approaches would commonly use a temporal origin.) Similarly, the detailed techniques are not limited solely to use with digital watermarks in a narrow sense, but encompass other methods for processing an image to encode other information (e.g., for authentication or digital signature purposes, for image-within-an-image encoding, etc.—all regarded as within the scope of the term "watermark" as used herein.) Accordingly, I claim as my invention all such embodiments as may come within the scope and spirit of the following claims and equivalents thereto.

I claim:

1. A method of encoding original data with watermark data, comprising:

analyzing the original data to discern innate watermark biases therein; and encoding watermark data in the original data, exploiting said innate biases to partially represent the encoded watermark, thereby yielding encoded data.

2. The method of claim 1 wherein the analyzing includes performing a decoding operation on the original data.

3. The method of claim 2 in which the analyzing includes performing plural decoding operations on the original data.

4. The method of claim 3 which includes performing one decoding operation on the original data when considered in a first manner, and decoding a second operation on the said data when considered in a second manner.

5. The method of claim 1 which includes selecting one or more watermark payload bits in accordance with said innate biases.

6. The method of claim 1 which includes selecting an encoding origin in accordance with said innate biases.

7. The method of claim 1 in which the original data represents image information.

8. The method of claim 1 in which the original data represents audio information.

9. The method of claim 1 that further includes decoding watermark data from the encoded data.

10. The method of claim 9 that further includes controlling an aspect of a system's operation based on at least part of the decoded watermark data.

11. The method of claim 10 in which the system is a content playback or recording system.

12. The method of claim 4 in which the first manner comprises considering the original data using a first watermarking origin, and the second manner comprises considering the original data using a second watermarking origin.

13. A computer storage media having stored thereon content processed in accordance with the method of claim 1.

14. A computer storage media having stored thereon software instructions for causing a programmable system to perform the method of claim 1.

* * * * *